Figure 1:
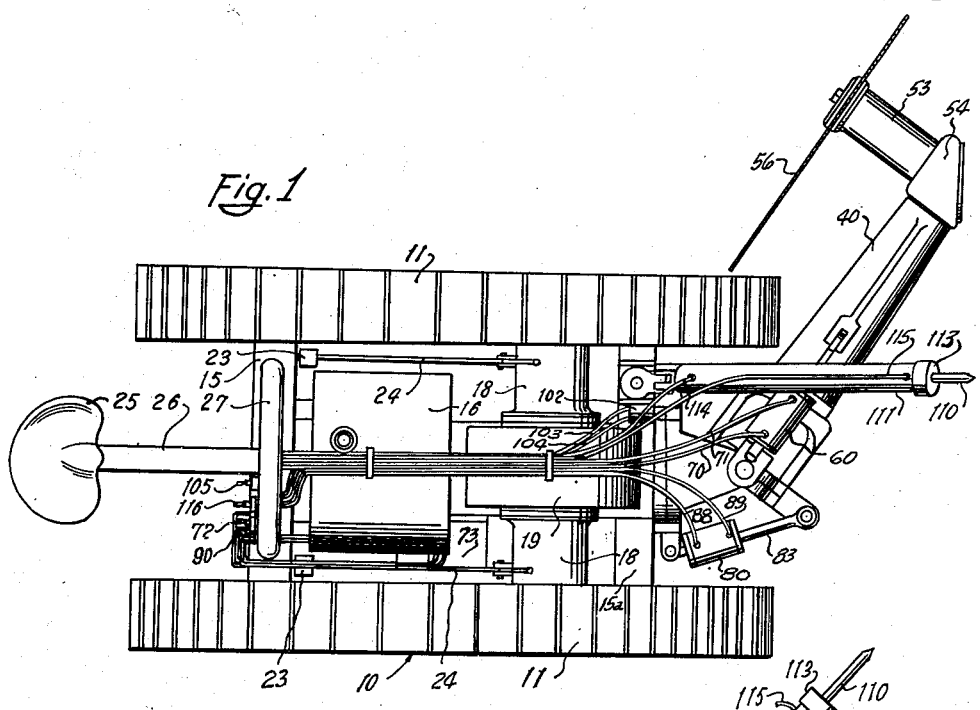

July 27, 1954

R. V. HOWELL 2,684,695

SELF-PROPELLED PORTABLE POWER SAW

Filed June 13, 1949

4 Sheets-Sheet 1

INVENTOR.
Robert V. Howell
BY

ATTORNEY

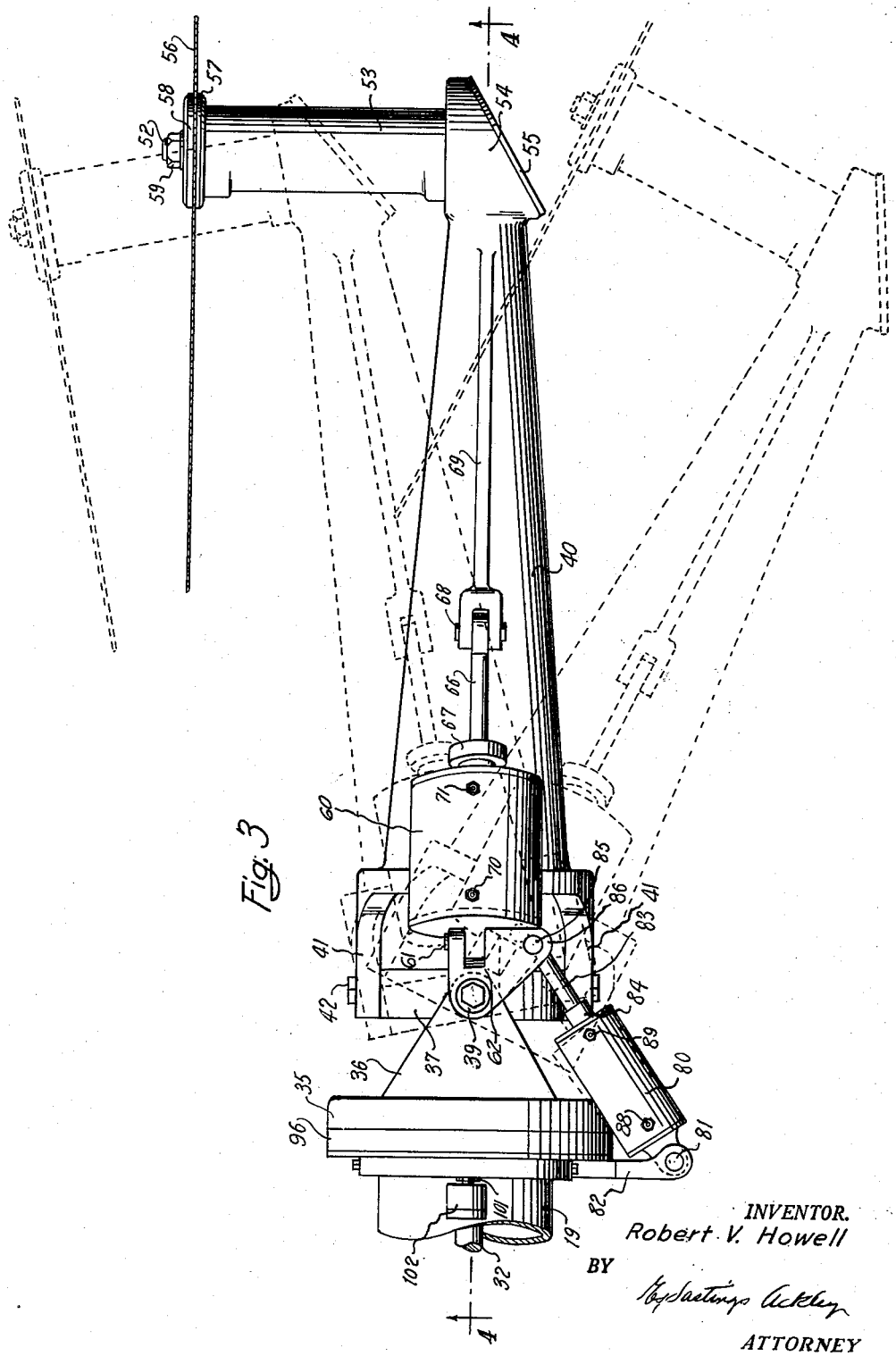

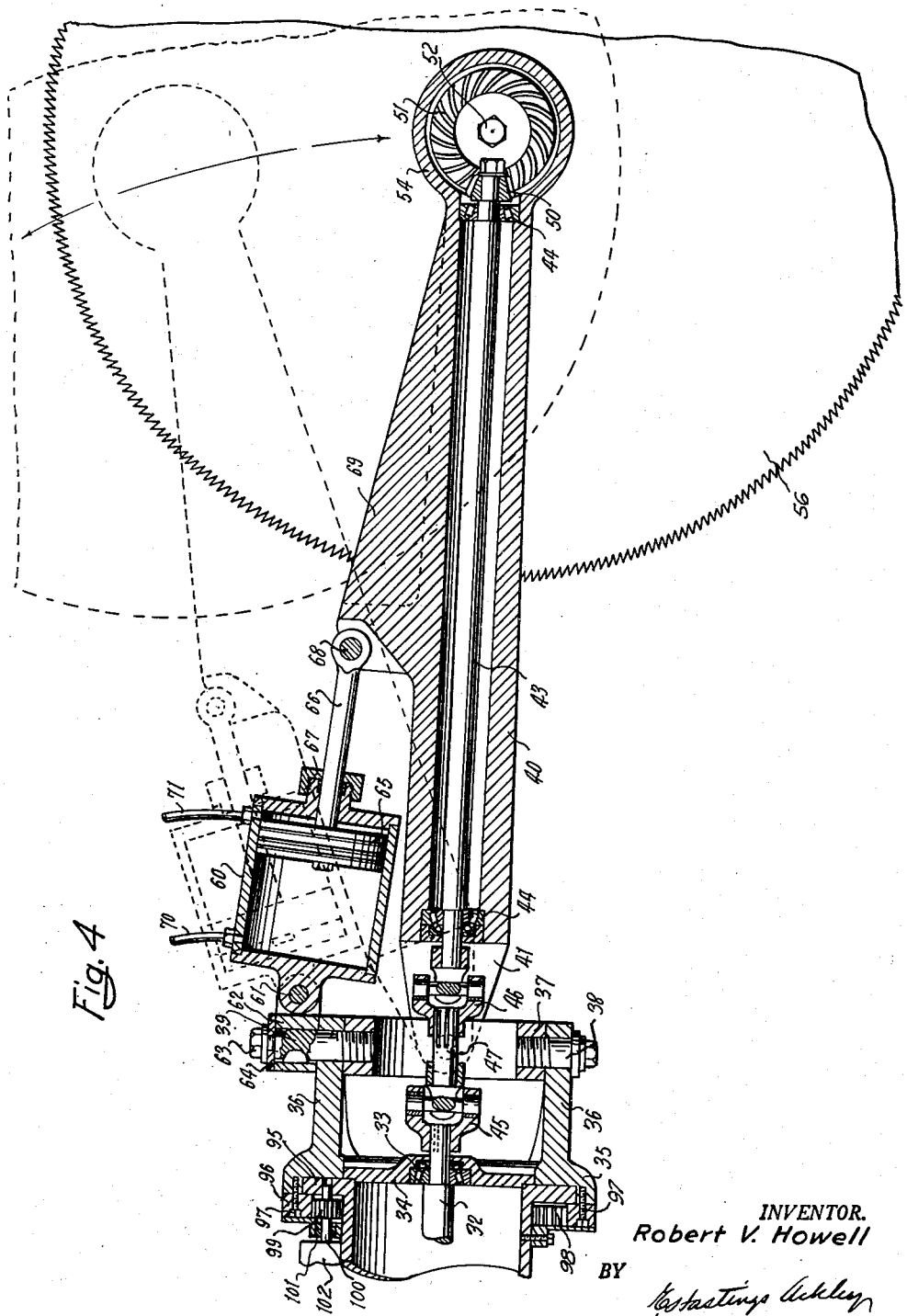

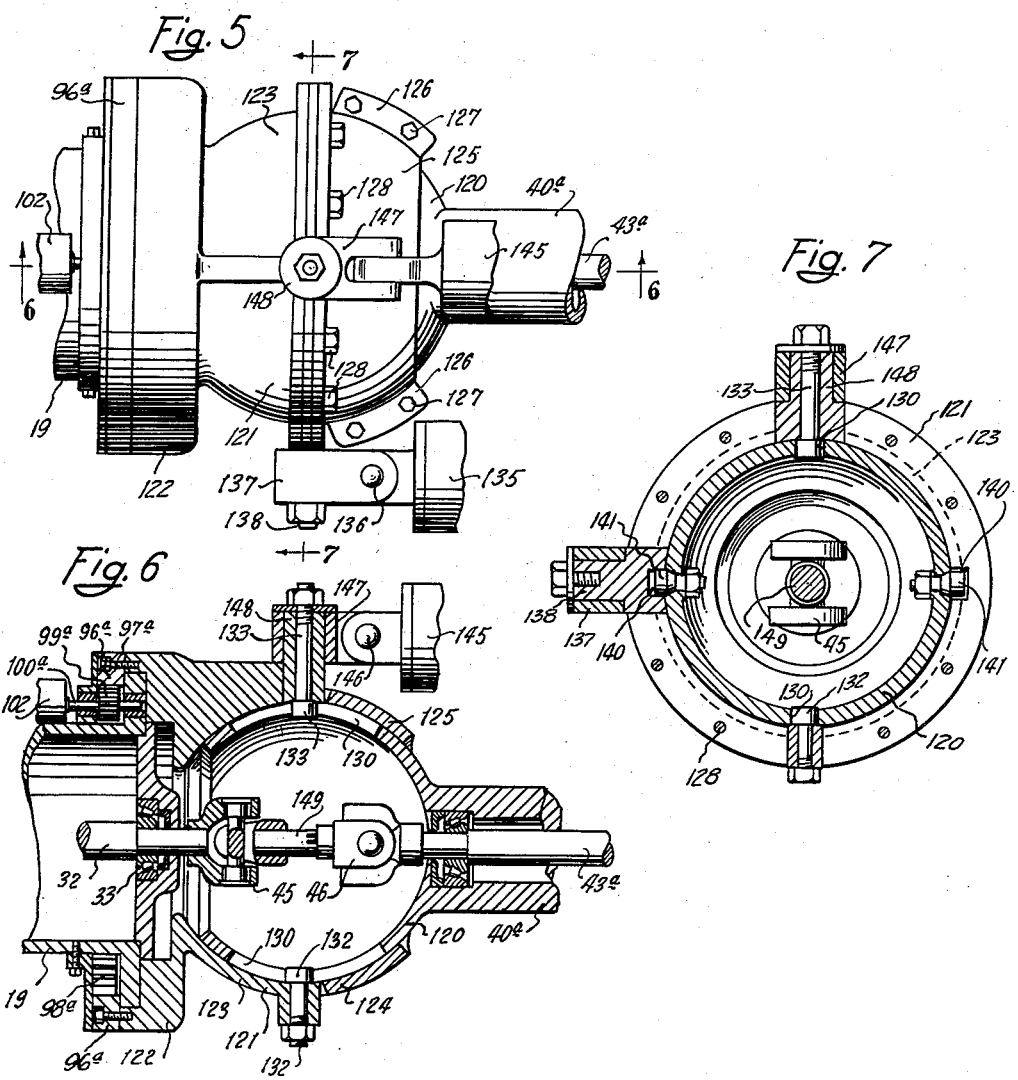

Patented July 27, 1954

2,684,695

UNITED STATES PATENT OFFICE 2,684,695

SELF-PROPELLED PORTABLE POWER SAW

Robert V. Howell, Jackson, Miss.

Application June 13, 1949, Serial No. 98,713

5 Claims. (Cl. 143—43)

This invention relates to new and useful improvements in self-propelled portable power saws, and more particularly to such saws having incorporated therein means for controlling the movement of the saw independently of the vehicle on which it is mounted.

A particular object of the invention is to provide a self-propelled power saw of the character described having an elongate saw-carrying boom mounted at the front of the vehicle and operable independently of movement of the vehicle, said saw boom being movable in the plane of the saw blade regardless of the angle of attack of the blade with respect to the article being cut.

Another object of the invention is to provide in a saw of the character described a saw-carrying boom which is disposed forwardly of the vehicle and is provided with means for swinging said boom in planes parallel to the plane of the saw blade and at right angles to the plane of the saw blade, and wherein the boom is also rotatable about its longitudinal driving axis.

A further object of the invention is to provide a saw of the character described wherein the movement of the saw-carrying boom is controllable from a remote position so that the saw may be operated by the driver of the vehicle.

An important object of the invention is to provide in a saw of the character described hydraulic control means for moving the saw boom.

A still further object of the invention is to provide a hydraulically controlled saw boom of the character described wherein means is provided in the hydraulic system for hydraulically locking the boom in any desired adjusted position.

Still another object of the invention is to provide in a saw of the character described an improved universal joint mounting for the saw boom.

Another object of the invention is to provide a self-propelled saw having a single power unit, wherein the vehicle may be driven by said power unit and the saw blade may be rotated by said power unit, either in unison or independently of each other, and wherein hydraulic means is provided for swinging the saw boom, said hydraulic means being operable independently of the power supplied to the drive shaft of the saw or the drive shaft of the vehicle.

A still further object of the invention is to provide a saw of the character described wherein the saw may be used on either side of the vehicle as well as at any point in the included arc between the positions at the sides of the vehicle, whereby it is possible to work in restricted areas such as narrow easements, on river banks or other embankments, in thick growth or in woods where it is necessary to clear a path through such growth or woods.

Figure 2:
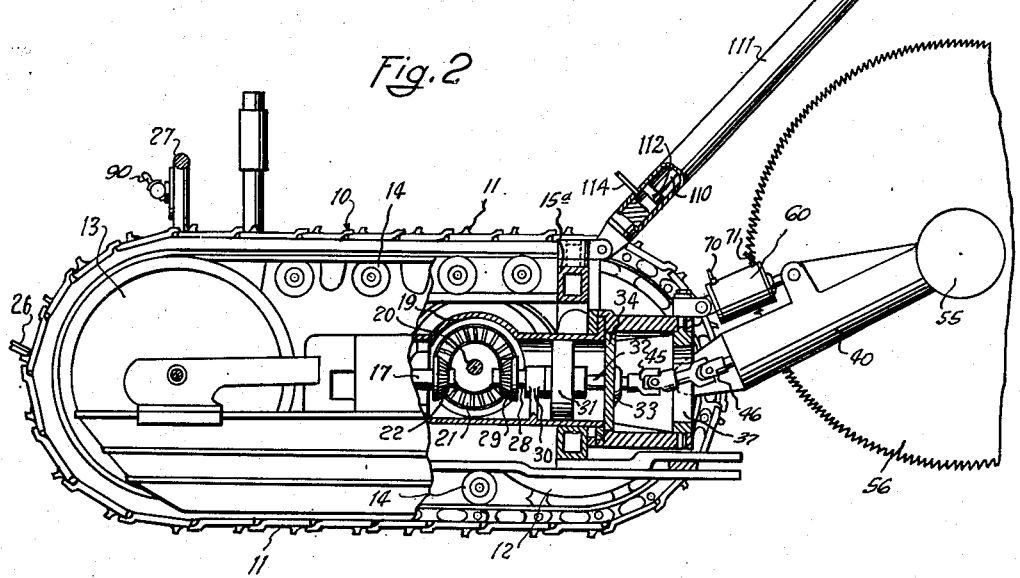

Additional objects and advantages of the invention will readily be apparent from the reading of the following description of a device constructed in accordance with the invention, and reference to the accompanying drawings thereof, wherein:

Figure 1 is a top plan view of a self-propelled portable power saw constructed in accordance with the invention, Figure 2 is a side view, partly in elevation and partly in section of the saw of Figure 1, Figure 3 is an enlarged view, in elevation of the movable saw boom, showing the manner in which the boom may be swung from position to position, Figure 4 is a longitudinal sectional view, taken on the line 4—4 of Figure 3, Figure 5 is a side elevation of a modified form of universal joint connection provided in the saw boom, Figure 6 is a longitudinal sectional view taken on the line 6—6 of Figure 5, and Figure 7 is a transverse vertical sectional view taken on the line 7—7 of Figure 5.

In the drawings, the numeral 10 designates generally a tractor, which is illustrated as being of the crawler or endless track type having spaced parallel track treads 11 on each side driven by drive wheels 12 and having follower wheels 13 and supporting rollers 14, whereby the tractor is supported on the crawler treads. Mounted on a frame 15 between the crawler treads is a power unit 16 which may be any suitable type of prime mover, but is preferably an internal combustion engine having a forwardly projecting drive shaft 17 (Fig. 2) to which is connected the mechanism for driving the tractor and also a mechanism for driving a saw, as will be hereinafter more fully explained.

A clutch and drive axle housing 18 projects on each side of a gear box or transmission housing 19 mounted just forwardly of the engine 16, and a transverse wheel drive shaft 20 is mounted in this gear case and extends axially of the clutch housings 18 on each side thereof, being geared to the drive wheels 12 at the forward end of the tractor which turn or drive the elongate crawler treads 11. A large bevelled gear 21 is mounted on the wheel drive shaft 20 and meshes with a smaller complementary bevel drive gear 22 which is secured on the forward end of the engine drive shaft, whereby the power from the engine is transmitted through the gears to the axle drive shaft 20.

Within the clutch housings 18 on each side of the transmission case are mounted separate two-way clutches (not shown) which may be of any well-known suitable type for controlling the direction of rotation of the large drive wheels 12. The direction of movement of the tracks or crawlers 11 is controlled by the clutches to cause said tracks to move either forwardly or backwardly, as desired, or at different speed ratios to cause turning of the vehicle in the well-known manner. The clutches are actuated by foot pedals 23 movably carried on the frame 15 near the rear of the vehicle and having elongate control bars 24 extending forwardly from the foot pedals and connected to the clutch mechanism for controlling the operation of the clutches. An operator's seat 25 is mounted on an elongate arm 26 projecting outwardly and upwardly from the rear of the frame 15.

A control supporting bracket or member 27 projects upwardly from the rear frame member 15 for receiving and supporting in accessible position the control means for operating the motor as well as other control means for the saw as will be hereinafter more fully explained.

A stub shaft 28, having a bevel gear 29 at its rear end meshing with the large bevel gear 21, is mounted in a bearing 30 and has its forward end connected to a clutch 31 in the transmission housing 19. Extending forwardly in axial alignment with the stub shaft 28 is a second stub shaft 32 which is connected at its rear end to the opposite side of the clutch 31 and is mounted in a bearing 33 in the end plate 34 for the transmission housing. The shaft 32 is therefore selectively driven by the engine or motor 16 when the clutch 31 is in engagement, but is permitted to remain stationary when the clutch is disengaged.

A support ring 35 is mounted on the forward end of the transmission housing so as to be rotatable about the axis thereof, and has a pair of forwardly projecting arms 36 in the outer end of which a ring member 37 is pivotally mounted on pins 38 and 39 extending through openings in said arm and connected to the ring. An elongate torque tube 40 has a pair of spaced rearwardly extending arms 41 which are pivotally secured to the ring member 37 by means of bolts 42 at points spaced ninety degrees from the pins 38 and 39, whereby the torque tube may pivot on the bolts 42 and may swing with the ring 37 on the pins 38, so that the torque tube is swingable in either the plane of the pins 38 and 39 or the plane of the bolts 42.

A power drive shaft 43 is mounted in bearings 44 provided at each end of the bore of the torque tube, and the rear end of said shaft is coupled to the stub shaft 32 by means of a pair of universal joints 45 and 46 arranged in close proximity to each other. The universal joints are disposed in such a manner with respect to the ring 37 that the center of the splined connecting shaft 47 which joins the two universal joints is disposed in alignment with the pins 38 and 39, whereby the universal joints are equally spaced to each side of the center line of such pins. The shaft 43 may thus be driven by the stub shaft 32 at any angle at which the torque tube is turned or swung.

Mounted on the end of the shaft 43 is a pinion 50 whose teeth engage those of the bevel gear 51 secured on a shaft 52 supported in suitable bearings in a housing 53 disposed at right angles to the outer end of the torque tube 40. The gears are enclosed in a gear housing 54 having a removable cover plate 55 providing access thereto. At the outer end of the housing 53, the shaft 52 projects through a suitable bearing support and oil seal and carries a saw blade 56, which is clamped between a plate 57 fixedly secured on the shaft and a retaining washer 58 held in place on the shaft by a nut 59, so that the saw blade is turned with the shaft.

For swinging the torque tube 40 about the bolts 42 in the plane of the saw blade, a hydraulic fluid cylinder 60 is pivotally mounted at one end on a pin 61 carried by a bifurcated support member 62 which is keyed on the pin 39 which supports the ring 37 in the arm 36 of the support ring 35 carried by the transmission housing. The support member 62 is held in place on the pin by means of a bolt 63 and a bearing washer 64. A piston 65 is reciprocable in the cylinder 60, and a piston rod 66 is connected with the piston and extends outwardly through a packing gland 67 at the outer end of the cylinder and has its extreme outer end connected by means of a pin 68 to a rib 69 on the torque tube. Hydraulic fluid introduced into the cylinder through a fluid conductor 70 will force the piston outwardly of the cylinder to move the torque tube in one direction about the bolts 42, whereas hydraulic fluid introduced through a conductor 71 communicating with the opposite end of the cylinder will move the piston rearwardly of the cylinder to draw the rod 66 inwardly and swing the torque tube in the opposite direction.

The conductors 70 and 71 extend rearwardly to a valve 72 mounted on the supporting bracket 27 in a position convenient for manipulation by the operator of the vehicle, and hydraulic fluid is supplied to the conductors under pressure from a pump 73 driven by the power unit 16. The pump communicates with a reservoir or tank (not shown) containing a supply of hydraulic fluid in the usual manner. The valve 72 is so connected with the conductors 70 and 71 that when hydraulic fluid pressure is delivered through one conductor to the cylinder on one side of the piston, pressure is exhausted from the cylinder on the opposite side of the piston through the other conductor. Thus, the movement of the torque tube may be accurately controlled, and when the supply of hydraulic fluid is shut off from both conductors 70 and 71 the fluid is trapped in the conductors and in the cylinder, and acts to hold the piston rigidly in a fixed position so that the torque tube is likewise held rigidly in the position determined by the position of the piston in the cylinder.

For swinging the torque tube and the ring member 37 about the axis of the pins 38 and 39, a second hydraulic cylinder 80 is pivotally mounted at its inner end on a pin 81 carried by a rigid supporting arm 82 secured to the supporting ring 35. A piston (not shown) is slidable in the cylinder and is connected with a piston rod 83 which extends outwardly through a stuffing box 84 at the outer end of the cylinder, said piston rod being pivotally connected by means of a pin 85 to a lateral extension 86 of the supporting member 62 which carries the cylinder 60. Hydraulic pressure fluid is introduced through a conductor 88 into the cylinder on the rear side of the piston for causing the piston to move outwardly of the cylinder and push the connecting member 62 in a counterclockwise direction in Figure 3 to swing the torque tube in such counterclockwise direction. Similarly, hydraulic fluid introduced through a conductor 89 to the outer portion of the cylinder acts against the piston to draw the piston rod 83 into the cylinder and to swing the member 86 in the opposite or clockwise direction, to cause the torque tube to swing in a clockwise direction therewith. The hydraulic conductors 88 and 89 extend rearwardly from the cylinder to a valve 90 on the upright support member 27, whereby hydraulic fluid pressure supplied to the conductors may be controlled by the valve. The valve communicates with the pump 73 in the same manner as the valve 72. Likewise, when the hydraulic fluid is supplied through the conductor 88, the conductor 89 is permitted to exhaust or return hydraulic fluid from the outer side of the piston in the cylinder to the tank or reservoir communicating with the pump 73; and, when hydraulic fluid is supplied through the conductor 89 to the outer side of the piston, the conductor 88 is placed in communication with the reservoir so that hydraulic fluid may exhaust from the cylinder on the inner side of the piston through the conductor into the reservoir. However, when the valve is operated to completely close both conductors, the hydraulic fluid trapped on each side of the piston in the cylinder 80 locks the piston against movement to rigidly hold the piston rod 83 and the torque tube 40 connected therewith in a fixed position.

The support ring 35 is rotatable about an external annular flange 95 at the outer end of the transmission housing, said supporting ring being rotatably maintained on the flange by means of a retaining ring 96 which is secured by bolts 97 to the inner end of said supporting ring, the retaining ring extending inwardly of the flange to prevent outward displacement of the supporting ring from the flange. The internal periphery of the retaining ring 96 is provided with gear teeth 98 which mesh with a spur gear 99 mounted on a shaft 100, which is journaled at one end in the flange 95 and which extends rearwardly through a bearing support 101 and has its other end connected with a hydraulic drive motor 102, by means of which the shaft is caused to rotate. The shaft thus rotates the spur gear 99 to cause the retaining ring 96 to be rotated, and thus turns the supporting ring 35 about the axis of the transmission housing. The torque tube 40 may therefore be rotated to various angles with respect to the vertical and horizontal by rotating the supporting ring 35 in the manner just described.

The hydraulic motor 102 is connected by means of hydraulic fluid conductors 103 and 104 with the pump 73, and by operating a valve 105 mounted on the support member 27, the motor 102 may be caused to move the supporting ring 35 through any desired degree of rotation to position the saw blade at any desired angle with respect to the horizontal plane of the ground. The hydraulic cylinder 80 and the piston therein may then be operated to swing the torque tube to any angle in a plane vertical to the plane of the saw blade to position the saw in any desired position for making a cut. When the blade has been properly positioned, the hydraulic cylinder 60 and piston therein may be utilized to move the saw blade in the plane of the blade to make the desired cut.

A pike hole or jack rod 110 is slidably mounted in a hydraulic cylinder 111 which is hingedly mounted at its inner end on a forward cross member 15a of the tractor frame. The inner end of the rod carries a piston 112 upon which hydraulic fluid introduced into the cylinder through a hydraulic fluid conductor 114 is adapted to act to move the rod or pole outwardly of the cylinder, and hydraulic fluid introduced into the outer end of the cylinder through a conductor 115 will act upon the piston 112 to retract the rod into the cylinder. The conductors 114 and 115 extend rearwardly to a valve 116 mounted on the support 27 and communicating with the hydraulic fluid pump 73, whereby the fluid supplied to the cylinder may be controlled by the valve. Thus, the rod may be extended or retracted by hydraulic fluid pressure acting on the piston in the cylinder, and the fluid supplied to the cylinder may be utilized to lock the piston and the jack rod 110 in any desired extended or retracted position by closing the valve 116 so that the hydraulic fluid is trapped in the cylinder on opposite sides of the piston. This pike pole or jack rod may be used for supporting or pushing trees or the like being cut by the saw to prevent the same from falling backward onto the tractor and the operator, or for any other desired purpose for which it is suitable.

Manifestly, the torque tube 40 and the shaft 52 at the outer end thereof may carry any other suitable implement other than the saw blade 56; as, for example, a ditcher or the like. Or, if desired, the torque tube may be used as a hoist member, or a bulldozer blade or the like may be connected to the outer end of the torque tube and positioned thereby for use in clearing land, moving dirt or the like with the tractor.

A modified form of a universal support for the torque tube is shown in Figures 5 through 7 inclusive. In this form of the device, the inner end of the torque tube 40a is provided with a substantially spherical ball member 120 which is releasably and movably clamped in a ball socket member 121 carried by a supporting ring 122 which is mounted on the forward end of the transmission housing 19 so as to be rotatable about the longitudinal axis of said housing. The ball socket 121 is formed in two sections; an inner section 123 which is integral with the supporting ring 122, and an outer section which is formed of two halves 124 and 125 having flanges 126 secured together by means of bolts 127. The halves 124 and 125 of the outer portion of the ball socket are fitted over the ball 120 on the inner end of the torque tube and are clamped together by means of the bolts 127, whereupon the joined halves are secured by means of bolts 128 to the inner section 123 of the socket so that the ball and torque tube are supported by the socket.

Diametrically disposed slots 130 are formed on opposite sides of the ball member and are adapted to receive the heads of bolts 132 and 133 which are clamped in the flanges of the inner section 123 of the ball socket. These slots permit the ball 120 to move through an arc in the plane of the slots so that the torque tube may be swung in such plane. A hydraulic cylinder 135 is pivotally supported on a pin 136 carried by a supporting arm 137 mounted on a pintle 138 carried by the inner section of the ball socket for moving the torque tube in the plane of the slots 130, said cylinder having a piston and piston rod (not shown) movable therein and connected with the torque tube to swing the same in the same manner as the hydraulic cylinder of the form first described.

Diametrically extending slots 140 are provided on opposite sides of the ball socket member, as shown in Figure 7, and are disposed in a plane extending through the axis of the supporting ring 122 at right angles to the plane of the slots 130. Studs 141 are secured to the ball member 120 and are disposed to slide in the slots 140, so the torque tube may swing through an arc in the plane of the slots, at right angles to the plane in which the torque tube may be swung by virtue of the slots 130 in the ball member.

A hydraulic cylinder 145 is pivotally mounted on a pin 146 carried by a support member 147 which is secured to a pintle 148 carried by the inner section 123 of the ball socket, said cylinder having a piston and rod (not shown) movable therein and connected with the torque tube 40a for swinging the torque tube by hydraulic pressure.

The torque tube is prevented from rotation about its axis by the engagement of the bolts 132 and 133 in the slots 130 and the engagement of the studs 141 in the slots 140. However, the torque tube and ball socket may be rotated with the supporting ring 122, which is arranged to be rotated by means of the spur gear 99a which drives a retaining ring 96a connected by bolts 97a to said supporting ring, said spur gear being mounted on the shaft 100a and driven by a fluid motor 102 in the same manner as the form first described. The universal joint members 45 and 46 connect the drive shaft 43a with the stub shaft 32 which is rotatable when the clutch 31 is engaged to connect the stub shaft with the drive shaft of the motor or power unit 16. The coupling rod 149 connects the two universal joint members and is so disposed that the universal joints are centered with respect to the ball member and the ball socket to permit swinging movement of the torque tube and provide for driving the shaft 43a with a minimum of vibration.

This ball socket universal joint support for the torque tube completely encloses the universal joints and drive shaft between the torque tube and the differential housing 19, to prevent dust and dirt and the like from having access thereto, and likewise provides a strong flexible support for the torque tube.

From the foregoing, it will be seen that an improved self-propelled power saw has been provided, wherein the saw is arranged for movement and operation independently of the movement of the vehicle on which it is mounted. It will also be noted that the saw is mounted on an elongate boom or torque tube carried at the front of the vehicle, said torque tube or boom being swingable by hydraulic fluid pressure means to substantially any desired position by virtue of the universal mounting of the tube on the vehicle, and that the saw carrying boom or torque tube is swingable in a plane parallel to the plane of the saw blade and in a plane at right angles to the plane of the saw blade and is also rotatable about its longitudinal driving axis. It will particularly be noted that the saw boom or torque tube is swingable to move the saw blade in the plane of the blade regardless of the angle of attack of the blade with respect to the article being cut.

It will further be seen that the hydraulic drive means for operating the boom is also so arranged that the boom or torque tube may be hydraulically locked in any desired adjusted position.

Furthermore, the saw carrying boom or torque tube is controllable from a remote position so that the saw may be operated by the driver of the vehicle from the operator's seat, and the saw is adapted for use on either side of the vehicle, as well as at any point in the included arc between the positions at the sides of the vehicle, whereby it is possible to work in restricted areas, such as narrow easements, on river banks or other embankments, and in thick growth or woods where it is necessary to clear a path in front of the vehicle as the vehicle progresses.

Likewise, the self-propelled saw of the invention is arranged to be driven by a single power unit, said power unit moving the vehicle and also selectively operating the saw blade, either in unison or independently of each other; and the power unit also drives a hydraulic pump for supplying hydraulic fluid pressure to the various hydraulic pressure cylinders for operating the saw boom or torque tube and for operating the jack bar or pike pole.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A self-propelled implement including, a power unit having a power take-off shaft and a transmission housing enclosing said power take-off shaft and having a circular outer end, a support rotatable on and about said circular outer end, a torque tube having a universal connection with said rotatable support, a driven shaft within said torque tube and having a universal joint connection at one end with said power take-off shaft of the power unit and having an instrument shaft at its other end disposed at a right angle to the longitudinal axis of the driven shaft for connection with an instrument to be rotated, a push-pull rod having one end pivotally connected with the torque tube, operating means connected with the rotatable support and with the push-pull rod and disposed to swing the torque tube in a plane extending axially of the torque tube perpendicular to the axis of the instrument shaft, a second push-pull rod having one end pivotally connected with the torque tube, second operating means having one end connected with the rotatable support and its other end connected with the second push-pull rod for moving said push-pull rod to swing the torque tube, said second push-pull rod and second operating means being disposed to swing the torque tube in a plane extending axially of the torque tube and instrument shaft and at right angles to the first plane, said first and second push-pull rod operating means being operable independently of movement of the power unit and means carried by the transmission housing for rotating the universal connection and torque tube about the longitudinal axis of said transmission housing and rotatable support.

2. A self-propelled implement including, a power unit having a power take-off shaft and a transmission housing enclosing said power take-off shaft and having a circular outer end, a support rotatable on and about said circular outer end, a torque tube having a universal connection with said rotatable support, the universal connection having first pivotal members providing for pivotal movement of the torque tube in one plane and second pivotal members providing for movement of the torque tube in a plane at right angles to said first plane, a driven shaft within the torque tube and having a universal joint connection with the power take-off shaft of the power unit and projecting from the outer end of the torque tube, and a pair of hydraulic fluid pressure operated push-pull rods connected with the rotatable support at one end and with the torque tube at their other end and disposed to swing the torque tube in planes extending axially of the torque tube at right angles to each other and in the planes of the pivotal members of the universal connection, and means carried by the transmission housing for rotating the universal conection and torque tube and the hydraulic fluid pressure operated push-pull means about the longitudinal axis of said transmission housing and rotatable support, said movements of the torque tube being effected independently of the movement of the power unit.

3. In combination, a tractor having a pair of spaced crawler treads, a power unit for the tractor mounted between the track treads, a transmission housing at one end of said power unit and having a circular outer end, a support rotatable on and about said circular outer end, a power take-off shaft projecting from the outer end of the transmission housing, a torque tube having a universal connection with said rotatable support, the universal connection having first pivotal members providing for pivotal movement of the torque tube in a first plane and second pivotal members providing for pivotal movement of the torque tube in a plane at right angles to said first plane, a driven shaft within said torque tube and having a universal joint connection at one end with the power take-off shaft concentric with the universal connection between the torque tube and the rotatable support and having means at its other end for connection with an instrument to be rotated, a hydraulic fluid pressure operated push-pull rod connected with the rotatable support and with the torque tube for swinging the torque tube in the plane of one of the pivotal members of the universal connection, a second hydraulic fluid pressure operated push-pull rod connected with the rotatable support and with the torque tube and disposed to move the torque tube in the plane of the second pivotal member of the universal connection and at right angles to the plane of movement of the torque tube by said first push-pull rod, movement of said torque tube with respect to the universal connection being limited to movement by the push-pull rods, and means carried by the transmission housing for rotating the universal connection, the torque tube and the hydraulic fluid pressure operated push-pull rods about the longitudinal axis of said transmission housing and rotatable support.

4. A self-propelled portable saw including, a vehicle having a power unit, a transmission housing at the forward end of the power unit and having a circular outer end, a support rotatable on and about said circular outer end, a power take-off shaft connected with the power unit and projecting forwardly from said housing, a torque tube having a universal connection with said rotatable support, said universal connection having first pivotal members providing for pivotal movement of the torque tube in a first plane and second pivotal members providing for movement of the torque tube in a plane at right angles to said first plane, a driven shaft within said torque tube and having a universal joint connection with the power take-off shaft of the power unit concentric with the universal connection between the rotatable support and the torque tube, said driven shaft having an implement shaft at its other end disposed perpendicular to the axis of said driven shaft for connection with a rotatable saw blade, said implement shaft being disposed with its longitudinal axis parallel to the axis of the second pivotal members of the universal connection, whereby the saw blade is disposed in a plane parallel to the longitudinal axis of the driven shaft and parallel to the axis of the first pivotal members of the universal connection, a pair of hydraulic fluid pressure operated push-pull rods separately connected with the rotatable support and with the torque tube and disposed to move the torque tube in planes extending axially of the torque tube at right angles to each other and in the planes of the pivotal members of the universal connection, said hydraulic fluid pressure operated push-pull rods limiting swinging movement of the torque tube to movement in the planes of the pivotal members, and means on the transmission housing for rotating the torque tube, the universal connection and the hydraulic fluid pressure operated push-pull rods about the longitudinal axis of said transmission housing and rotatable support.

5. A self-propelled portable saw including, a tractor having spaced parallel crawler track treads and a power unit, a transmission housing connected with the power unit and having a power shaft disposed therein and operatively connected with the power unit, said transmission housing having a circular outer end, a support rotatable on and about said circular outer end, an elongate torque tube having a universal connection with the rotatable support, a driven shaft within the torque tube and having at one end a universal joint connection with the power shaft concentric with the universal connection between the torque tube and rotatable support and having at its other end an instrument shaft disposed perpendicular to the axis of the driven shaft for connection with a rotary saw blade, a rigid hydraulic fluid pressure operated push-pull rod connected at one end with the torque tube and at its other end with the rotatable support for swinging said torque tube in a plane parallel to the plane of the saw blade, a second hydraulic fluid pressure operated push-pull rod connected at one end with the torque tube and at its other end with the rotatable support for swinging the torque tube in a plane extending through the axis of the torque tube in the plane of the instrument shaft and at right angles to the plane of the saw blade, swinging movement of the torque tube with respect to the transmission housing being limited to movement by the rigid push-pull rods, and a hydraulic fluid motor carried by the transmission housing and connected with the rotatable support for rotating said torque tube, universal connection and hydraulic fluid pressure operated push-pull rods about the longitudinal axis of said transmission and rotatable support.

References Cited in the file of this patent

UNITED STATES PATENTS

| Number | Name | Date |
|---|---|---|
| 1,316,743 | Roche et al. | Sept. 23, 1919 |
| 1,902,148 | Vodoz | Mar. 21, 1933 |
| 2,099,373 | Richards | Nov. 16, 1937 |
| 2,287,479 | Kelsey | June 23, 1942 |
| 2,462,314 | Fuqua | Feb. 22, 1949 |
| 2,559,711 | Dansereau | July 10, 1951 |
| 2,612,362 | Driehaus | Sept. 30, 1952 |